United States Patent
Jensen et al.

(10) Patent No.: US 9,100,928 B2
(45) Date of Patent: Aug. 4, 2015

(54) SCALABLE WIRELESS MULTICELL VOIP ARCHITECTURE

(75) Inventors: Rune Strøm Jensen, Nørresundby (DK); Henrik Hvedegaard, Aalborg AV (DK); Lars Hansen, Nørresundby (DK); Jens Toftgaard Petersen, Svenstrup J (DK)

(73) Assignee: RTX A/S, Nørresundby (DK)

( * ) Notice: Subject to any disclaimer, the term of this patent is extended or adjusted under 35 U.S.C. 154(b) by 126 days.

(21) Appl. No.: 13/995,632

(22) PCT Filed: Dec. 16, 2011

(86) PCT No.: PCT/DK2011/050488
§ 371 (c)(1),
(2), (4) Date: Jun. 19, 2013

(87) PCT Pub. No.: WO2012/089209
PCT Pub. Date: Jul. 5, 2012

(65) Prior Publication Data
US 2013/0272208 A1    Oct. 17, 2013

(30) Foreign Application Priority Data
Dec. 29, 2010 (EP) .................................. 10197291

(51) Int. Cl.
| | |
|---|---|
| *H04W 4/00* | (2009.01) |
| *H04W 76/00* | (2009.01) |
| *H04W 36/00* | (2009.01) |
| *H04L 29/06* | (2006.01) |
| *H04W 36/28* | (2009.01) |

(52) U.S. Cl.
CPC ........... *H04W 76/00* (2013.01); *H04L 65/1069* (2013.01); *H04W 36/0005* (2013.01); *H04L 65/1036* (2013.01); *H04L 65/1053* (2013.01); *H04W 36/28* (2013.01)

(58) Field of Classification Search
CPC . H04W 76/00; H04W 36/0005; H04W 36/28; H04W 65/1036; H04W 65/10543; H04W 65/1069
See application file for complete search history.

(56) References Cited

U.S. PATENT DOCUMENTS 6,879,600 B1 * 4/2005 Jones et al. .................. 370/466
7,035,932 B1 * 4/2006 Dowling ....................... 709/230
(Continued)

FOREIGN PATENT DOCUMENTS

EP    1 345 462 A1    9/2003

OTHER PUBLICATIONS

International Search Report for PCT/DK2011/050488 dated Feb. 16, 2012.

*Primary Examiner* — Kevin Mew
(74) *Attorney, Agent, or Firm* — Knobbe Martens Olson & Bear LLP

(57) ABSTRACT

Wireless base station device for handling wireless communication, e.g. DECT, between a plurality of associated wireless terminals and an IP network. The base station device has a radio transceiver, a network interface, and a processor with communication application and a communication session management software. The communication session management is arranged to control a communication session with an associated wireless terminal (upper layer management), while wireless communication with said associated wireless terminal involved with said communication session (lower layer) is handled by another base station device. Thus, the base station can manage separate operation of its upper and lower layer, thereby enabling e.g. hand-over of a session to and from other base stations. This allows self contained single casing base station devices to operate in a network without the need for at central server, and still such network is easy to extend by adding base stations.

15 Claims, 4 Drawing Sheets

(56) References Cited

U.S. PATENT DOCUMENTS

| | | | |
|---|---|---|---|
| 2003/0125023 A1* | 7/2003 | Fishler | 455/426 |
| 2005/0271011 A1* | 12/2005 | Alemany et al. | 370/331 |
| 2007/0280252 A1 | 12/2007 | Chuang | |
| 2008/0026775 A1 | 1/2008 | Arazi et al. | |
| 2008/0085741 A1* | 4/2008 | Tauberman et al. | 455/567 |
| 2008/0117076 A1* | 5/2008 | Klaus et al. | 340/870.02 |
| 2010/0329243 A1* | 12/2010 | Buckley et al. | 370/352 |

* cited by examiner

SCALABLE WIRELESS MULTICELL VOIP ARCHITECTURE

CROSS REFERENCE TO RELATED APPLICATIONS

This application is a U.S. National Phase Application of PCT International Application Number PCT/DK2011/050488, filed on Dec. 16, 2011, designating the United States of America and published in the English language, which is an International Application of and claims the benefit of priority to European Patent Application No. 10197291.7, filed on Dec. 29, 2010. The disclosures of the above-referenced applications are hereby expressly incorporated by reference in their entireties.

FIELD OF THE INVENTION

The invention relates to the field of wireless Radio Frequency communication, such as Digital Enhanced Cordless Telecommunication (DECT) communication devices and networks. More specifically, the invention provides a wireless base station device which can e.g. form part of a wireless VoIP network without requiring a central server, thus providing a VoIP network which is scalable, i.e. which can be extended by further base stations, without requiring the user to reconfigure the system or its components.

BACKGROUND OF THE INVENTION

DECT or DECT/Cat-iq (Cordless Advanced Technology—internet and quality) protocols and devices are known to provide efficient and reliable communication of a speech data, e.g. by means of Voice over Internet Protocol (VoIP) communication, between a wireless handset and a base station.

In small systems, a self-contained base station has a limited number of wireless handsets registered thereto. Such systems are rather economic and simple to install, but it is impossible to enhanced wireless coverage and increase the number of handsets outside the limit of the base station, unless repeater devices are used.

In traditional larger setups for VoIP, a number of spatially distributed base stations communicate with a central server with software that manages to centrally control calls to/from a plurality of mobile wireless handsets. Hand-over or roaming between base stations, i.e. when a handset moves out of reach of one base station and into the coverage range of another base station, is also handled by the central server. Such systems offer scalability, since it is often possible for the central server to manage addition of extra base stations.

However, such central server setups suffer from several drawbacks. For small companies with a limited number of wireless handsets and a limited space covered by few base stations, a rather expensive and maintenance requiring central server is still needed for such system to function. Furthermore, in case an extension of such system is desired, the server configuration must be updated to handle one or more additional base stations. This may be rather complicated and thus requires a specialist, and therefore normal users are unable to perform such extension themselves. A dedicated server is a relative large overhead for small system configurations.

SUMMARY OF THE INVENTION

Thus, following the above description, it is an object of the present invention to provide a device and a system which is capable of providing a scalable DECT compatible VoIP network still with possibility of seamless hand-over of communication sessions, e.g. calls, between base stations. Preferably, the system is prepared to be self-configuring.

According to a first aspect, the invention provides a wireless base station device arranged to handle wireless communication between a plurality of associated wireless terminals and an IP network, the device comprising
  a radio transceiver arranged to wirelessly communicate with the plurality of wireless terminals, and
  a network interface arranged to communicate with the IP network,
  a processor with software arranged to implement
    a communication application, and
    a communication session management for controlling sessions of
      communication with the plurality of associated wireless terminals,
wherein the communication session management is arranged to control a communication session with an associated wireless terminal, while wireless radio frequency communication with said associated wireless terminal involved with said communication session is handled by an associated external device, such as an external wireless base station device.

Given an IP network connection, a number of such base station devices spatially distributed will allow to form e.g. a DECT network, where wireless terminals in the form of mobile handsets can perform e.g. VoIP communication via the base station devices without the need for a central server to handle the each individual communication sessions. Since one single base station device includes communication session management, IP network interface, and wireless radio transceiver, several such base station devices can work together and ensure free roaming and seamless hand-over of on-going communication sessions (calls) because the communication session management is arranged to manage communication sessions where the wireless terminal communication is performed by the base station's own radio transceiver, or via another base station's radio transceiver in the network. This allows free roaming and hand-over of on-going communication sessions if a wireless terminal moves out of coverage of one base station and into the coverage of another base station. The session management can remain in the base station which initiated the session, while the physical wireless communication with the wireless terminal is handed over to another base station in the network.

In other words, the functions of the radio transceiver and the processor in the base station are arranged such that they can function separately. The function of the traditional central server can be seen as distributed between the base station devices. This means that with such base station devices it is possible to increase system capacity and ability to handle a larger number of wireless terminals and to expand the wireless coverage by simply connecting further base station devices without the need to change software setting in a central server. This is advantageous for e.g. small companies that are growing in size: the wireless, e.g. DECT, network coverage can be easily scaled with the growth of the company without the initial large investment in a complicated and expensive server system which is normally required to implement such system scalability.

The possibility of providing the base station with control software that ensures the base station to be highly self-configurable in the network, it is easy for a user to add a base station and thus extend the network without complicated updating and software configuration procedures.

In the following various embodiments of the invention will be described.

In preferred embodiments, the base station device is implemented with the radio transceiver, the network interface and the processor housed within one single casing. E.g. the device can be powered from the IP network connection, in case the network interface is a wired interface. Otherwise the device may be battery powered or powered from an external or internal power supply power from an external power net. It is to be understood that the various elements of the base station device may alternatively be implemented in two or more casings with wired interconnections.

The device may be further arranged to handle wireless radio frequency communication with an associated wireless terminal involved with a communication session, while said communication session is controlled by an associated external device, such as an external wireless base station device. Thus, the base station can both handle management communication sessions which is executed by another base station, and the base station can also execute wireless communication in sessions managed by another base station. This allows the base station to form part of flexible networks where seamless hand-over can be performed both to and from the base station device.

The device may be seen as divided into "lower layer" functionalities, i.e. radio communication with the wireless terminals, and "upper layer" functionalities, i.e. session management. In a preferred embodiment, the lower layer comprises the radio transceiver, and the upper layer comprises the communication application and the communication session management, wherein the device comprises a routing layer serving to separate the lower layer and the upper layer so as to allow the upper layer to handle communication sessions with associated lower layers physically separate from the upper layer. Thus, such routing layer serves to implement the separation of upper layer and lower layer functions in the base station device. The routing layer can be implemented in various ways, but preferably the routing layer includes logics enabling handling of addressing of messages between the upper and lower layers and the network interface, so as to allow the upper and lower layers to function separately together with upper and lower layers physically present in an external base station device connected to the IP network. Preferably, the lower layer comprises processing means for coding of user data, such as transcoding of audio data. Audio transcoding capabilities will allow the lower layer to translate user data in the form of audio data from a mobile handsets to various audio standards to the IP network.

Preferably, the communication session management is arranged to hand-over an on-going communication session with an associated wireless terminal to an associated external wireless base station device. Preferably, such hand-over is performed by the device being arranged to receive user data from said external wireless base station device and to relay the user data to the IP network by maintaining an IP address already assigned to the communication session before hand-over. Thus, the external base station to which the session has been handed-over now performs the wireless terminal communication, while the base station receives and relays the user data, e.g. audio data, to the IP network and still performs management of the session (if the session was initiated by the device).

In a wireless network systems, such as DECT, communication sessions can be initiated either from network side or wireless terminal side. However, the physical wireless connections are normally only established by the wireless terminal towards suitable basestations. In order to support communication sessions to be initiated from network side, the wireless terminals performs a initial or regular locations registration procedure, that initiates upper layer instance in a basestation. When communications sessions, such as incoming calls, have to be initiated from network side, paging messages are broadcasted on one or more basestations in order trig the wireless terminals to establish suitable physical wireless connections to serve the network upper layer communication sessions.

In one embodiment, the device is arranged to receive paging information from the IP network, and to transmit paging information in a wireless signal via the radio transceiver, so as to allow roaming of the plurality of associated wireless terminals. Thus, by such distribution among base station devices of paging, a wireless terminal can receive e.g. a VoIP call irrespective of which base station device of the network the terminals can wirelessly reach.

In one embodiment, the processor is arranged to exchange system configuration data and identity information on the plurality of associated wireless terminals via the IP network, such as according to a prestored scheme or upon request. Thus, with the device being arranged to distribute such information, all base stations of the network can be updated of system and wireless terminal information. This allows e.g. a network user or manager to update system configuration on only one base station of the network. This base station then serves to update the other base stations in the network.

In one embodiment, the plurality of associated wireless terminals comprises a plurality of wireless mobile handsets arranged for speech communication, such as wireless mobile handsets arranged for DECT communication. The radio transceiver is then arranged for DECT communication, and the device further comprises audio processing means arranged for processing of DECT audio data. As already mentioned, such embodiments are suited as base stations in a cordless phone network which is easy to expand by further base stations. Especially, the device may include audio processing arranged to handle wide-band audio data.

Preferably, the device is arranged for timing synchronization of the radio transceiver with an associated external wireless base station device.

The device may be arranged for assignment of an identification number on the IP network. This allows several base stations to identify themselves to each other as belonging to a specific wireless network and thus to be able to cooperate and distribute upper layer and lower layer functionalities as already described.

In general, the device may be arranged to wirelessly communicate according to a communication standard being one of: DECT/CAT-iq, Bluetooth, WiFi, GSM, LTE, Wimax, 3G, and 4G. The communication application may comprise a VoIP application so as to enable the device to handle VoIP communication between wireless terminals and the IP network.

The network interface may be a wired or wireless IP network interface, e.g. an interface arranged for a wired Ethernet connection or a wired VDSL connection. Especially, the device may be arranged to receive power to run at least some of or all of the circuits of the base station device via the Ethernet connection.

The device may be implemented by one single processor, i.e. the processor being arranged to carry out all processing required by the upper layer, routing layer and lower layers. However, in some versions it may be desired to separate different functionalities of the device between two or more processors.

The base station may include algorithms arranged to distribute communication session management to non-busy base stations in the network, e.g. by the base station device being arranged to transmit, via the IP network, information regarding the number communication sessions currently handled by the base station device. This will allow the base stations to automatically distribute session management to more or less idle base station devices of the network and thus utilize processing capacity in such devices, thereby enhancing the total capacity in a network of base station devices.

In a second aspect, the invention provides a wireless network system comprising
  a plurality of wireless base station devices according to the first aspect, and
  a plurality of wireless terminals arranged for wireless communication via the radio transceiver of at least one of the plurality of wireless base station devices.

It is appreciated that embodiments mentioned for one aspect may in any way be combined with embodiments of any one or more embodiments of the other aspects.

BRIEF DESCRIPTION OF DRAWINGS

In the following, the invention will be described in more details by referring to embodiments illustrated in the accompanying drawings, of which

DETAILED DESCRIPTION OF THE INVENTION

Figure 1:
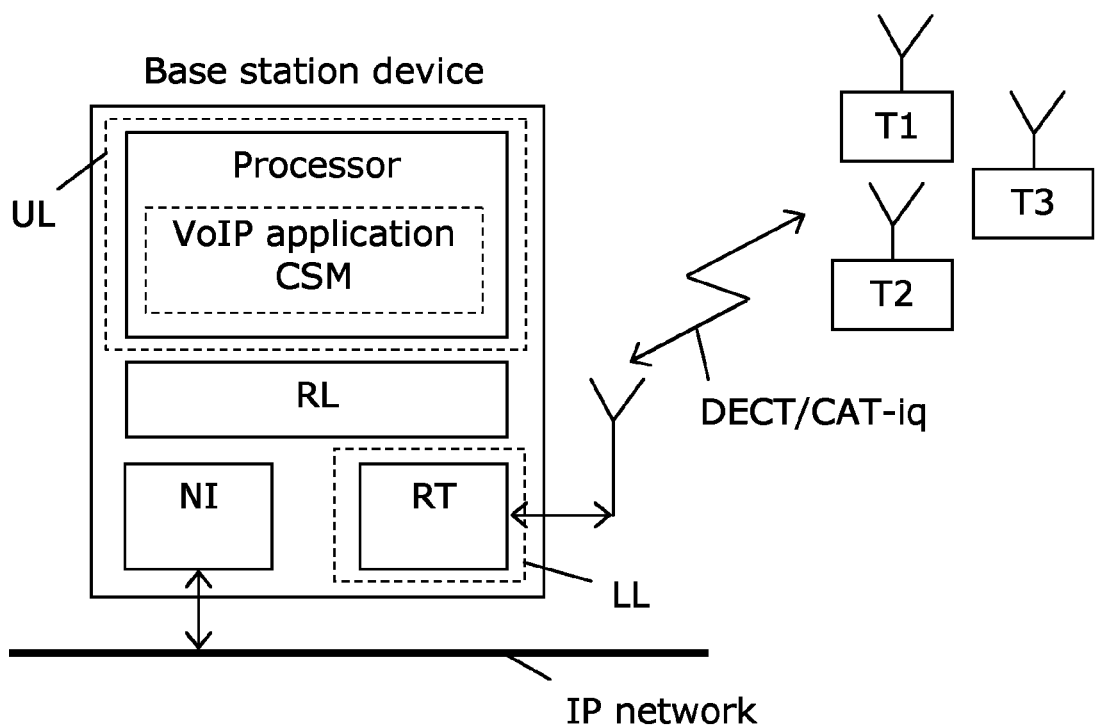
FIG. 1 illustrates a wireless base station device embodiment suited for VoIP communication with mobile terminals.

FIG. 1 illustrates basic elements of a base station device embodiment connected via a network interface NI to an IP network, e.g. a wired Ethernet, and capable of wireless communication with three wireless terminals T1, T2, and T3, e.g. mobile handsets, according to a DECT/CAT-iq protocol.

A processor serves to run a communication application, here illustrated as a VoIP application, and software implementing communication session management functionalities CSM allowing the base station device to handle and control a communication session with one or more of the wireless terminals T1, T2, T3 by means of the wireless radio transceiver RT. These functions performed by the processor can be seen as basic parts of what can be denoted "upper layer" UL functionalities. The radio transceiver RT, here illustrated as a DECT/CAT-iq compatible radio transceiver RT, can be denoted "lower layer" LL since it serves to perform the physical wireless communication with the wireless terminals T1, T2, T3. The special feature of the base station device according to the illustrated embodiment is that it includes a "routing layer" RL, which serves to handle communication between the upper layer UL, the lower layer LL, and the network interface NI. This allows separate operation of the upper layer UL and the lower layer LL. Hereby, several similar base station devices can be connected to the IP network and distribute upper layer and lower layer handling of one communication session between two base station devices. Preferably, each base station devices can handle:
  1) both lower layer and upper layer handling of a communication session,
  2) only lower layer communication in a communication session where another base station device handles upper layer functions of the session, and
  3) upper layer communication in a communication session where another base station device handles lower layer communication.

This allows a network to support free roaming and seamless hand-over. In all cases 1)-3), the routing layer RL severes to communicate between the upper layer and the lower layer—whether these are physically present within one single device, or whether only the upper layer UL or the lower layer LL in the device is active in the communication session. If for one communication session the upper and lower layer functionalities are in different devices, the routing layer RL will perform the necessary intercommunication via the network interface NI and thus the IP network to its routing layer counter part in the external base station device.

In FIG. 1 the base station device is illustrated as contained within one single casing, e.g. with all its circuit elements power from the wired Ethernet connection. Thus, the device may be in the form of one single casing with with only one or more IP network connection sockets available from outside. The radio transceiver may include an internal antenna, or it may be connected to an antenna socket available from outside. The processor may be arranged to perform all required processing in both upper layer UL, routing layer RL, and lower layer LL. In simple low cost versions, one single processor can handle all processing required to implement UL, RL, and LL functions.

Figure 2:
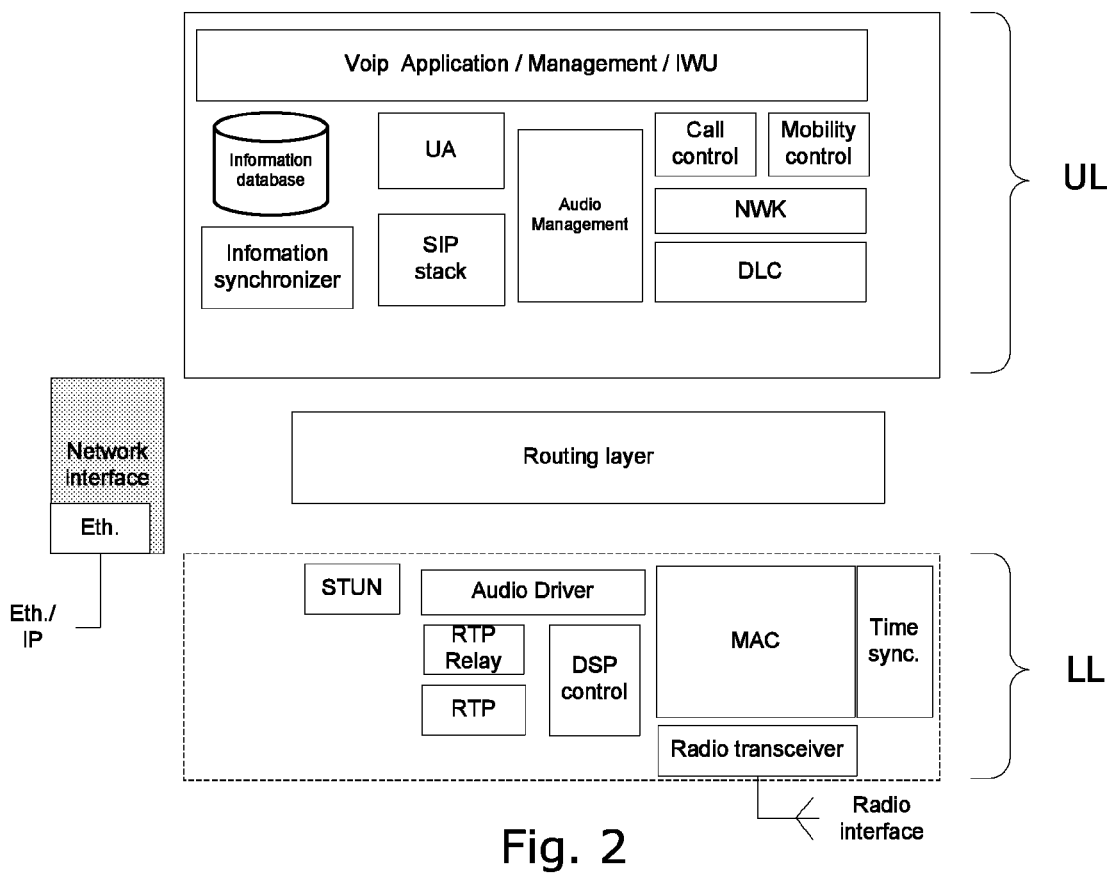
FIG. 2 illustrates a block diagram of a base station device embodiment with elements of upper layers and lower layers indicated, and with indication of an intermediate routing layer.

In the following, a number of abbreviations are used:
DECT Digital Enhanced Cordless Telecommunication
DLC Data Link Control
DSP Digital Signal Processor
Eth Ethernet
IP Internet Protocol
IWU Inter Working Unit
MAC Media Access Control
NWK if Network Interface
NWK Network
PMID Portable MAC identifier
PARI Primary Access Rights Identifier
PBX Private Branch eXchange
RFP Radio Fixed Part
RFPI Radio Fixed Part Identifier
RPN Radio Part Number
RSSI Received Signal Strength Indication
RTP Real Time Protocol
SIP Session Initiated Protocol
STUN Session Traversal Utilities for NAT
UA User Agent
VoIP Voice over IP
WRS Wireless Relay Station FIG. 2 illustrates in more details the functions included in the upper layer UL and in the lower layer LL of one base station device embodiment. The upper layer UL includes a communication application, here a VoIP application, and communication management and call control facilities, as already described in relation to FIG. 1. It is noted that the lower layer includes all audio processing, i.e. audio driver, DSP control and MAC, thus allowing coding of user data from the wireless terminals in the form of audio data. If necessary, the base station device includes processing means to transcode the audio data.

Information in the information database is exchanged and synchronized via the routing layer. Data are formatted and added header information and distributed via the IP network, e.g. using IP multicast. The distribution may be performed at regular time intervals, or upon any update. E.g. data in the database are supplied with a time stamp which will enable the base station to verify if update of some data in the information database need to be updated.

Figure 3A:
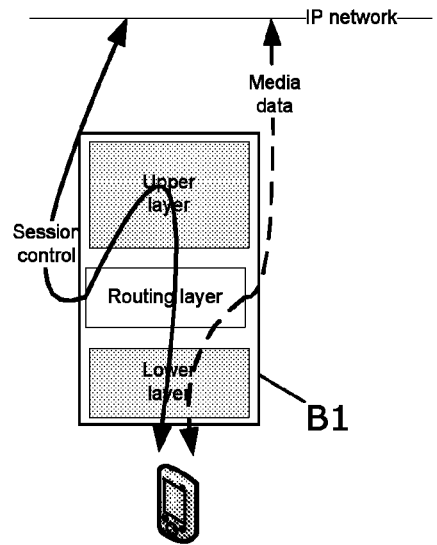
FIGS. 3a, 3b, and 3c illustrate different communication session scenario so as to illustrate the role of the separate upper and lower layers of the base station device.
Figure 3B:
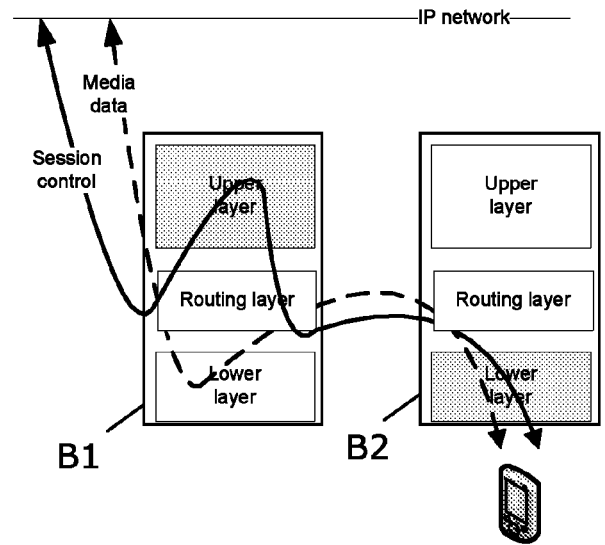
Figure 3C:
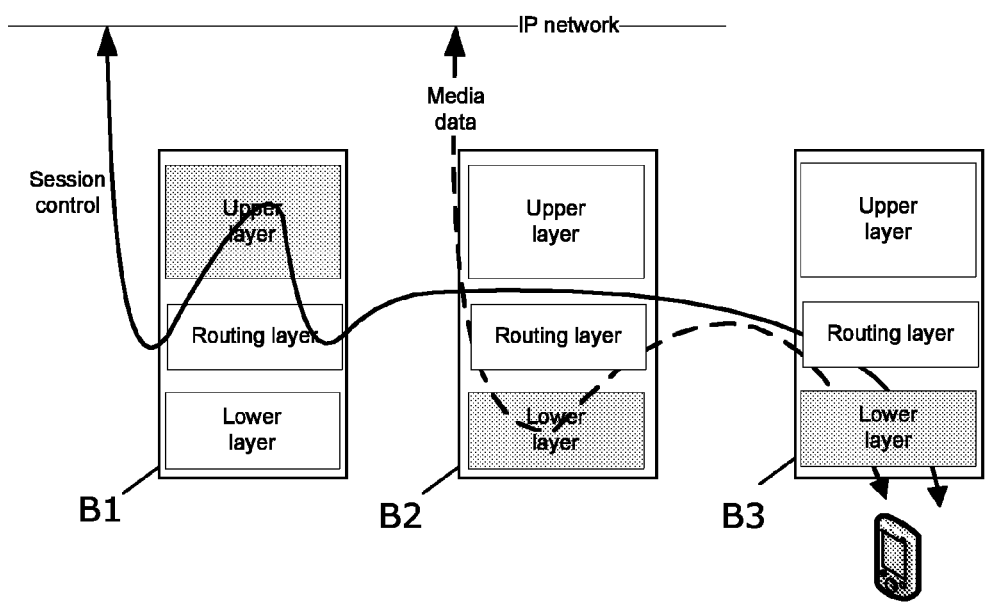

FIGS. 3a-c illustrate the role of the upper, routing, and lower levels of a base station device in three different scenario, where up to three base station devices B1, B2, B3 are involved in one single communication session with a wireless terminal.

FIG. 3a shows a simple situation where a base station device B1 has an upper layer which manages a communication session with the wireless terminal, and wherein the lower level of the same base station device B1 handles the physical wireless communication with the wireless terminal. Media data are routed from the lower layer via the routing layer to the IP network. Session control data are communicated with the wireless terminal via the lower layer, the routing layer, and the upper layer, and again via the routing layer to the IP network.

FIG. 3b shows a situation where two base station devices B1, B2 are involved in a communication session with the wireless terminal. E.g. the session has been initiated as described in relation to FIG. 3a, i.e. the session being initiated and solely handled by B1. The communication connection can then be handed over to B2, e.g. in case the wireless terminal has moved out of wireless reach of B1, whereas communication session management is still handled by B1. Thus, now the lower layer of B2 handles the wireless communication with the wireless terminal and routes both media data and session control data via its routing layer to the IP network and thus enables the routing layer of B1 to receive both via its routing layer. The media data are then routed to the lower layer of B1, while the session control data are routed to the upper layer which still controls the communication session, whereas the upper layer of B2 is not involved in the communication session. This free the upper layer of B2 for controlling other communication sessions which may be handled by its own lower layer or by a lower layer of an external base station, e.g. B1.

FIG. 3c shows a situation where a communication session involves three base station devices B1, B2, B3. E.g. the situation occurs if a communication session is initiated by upper layer of B1 and lower layer of B2, e.g. because the latest location registration of the wireless terminal was performed on B1. The communication session may then have been handed over to B3, e.g. due to the wireless terminal having moved out of wireless reach of B2 but into the wireless coverage range of the radio transceiver of the lower level of B3. This situation would be similar to that illustrated in FIG. 3b. However, e.g. due to B2 and B3 being involved in too many communication sessions, while B1 has free upper level capacity, B2 may broadcast a request to hand over upper layer handling of the communication session, or because the latest location registration of the terminal was performed on B1. Due B1 being the available base station on the network with the highest extra capacity, it is selected to receive upper layer control of the communication session. Thus, hereby all three base stations B1, B2, B3 are involved in the communication session. B1 handles upper layer functions, relayed via routing layers of B2 and B3. B3 handles lower layer communication with the wireless terminal and relays media data via routing layers of B3 and B3 to lower layer of B2 and further via B2 routing layer to the IP network.

Figure 4:
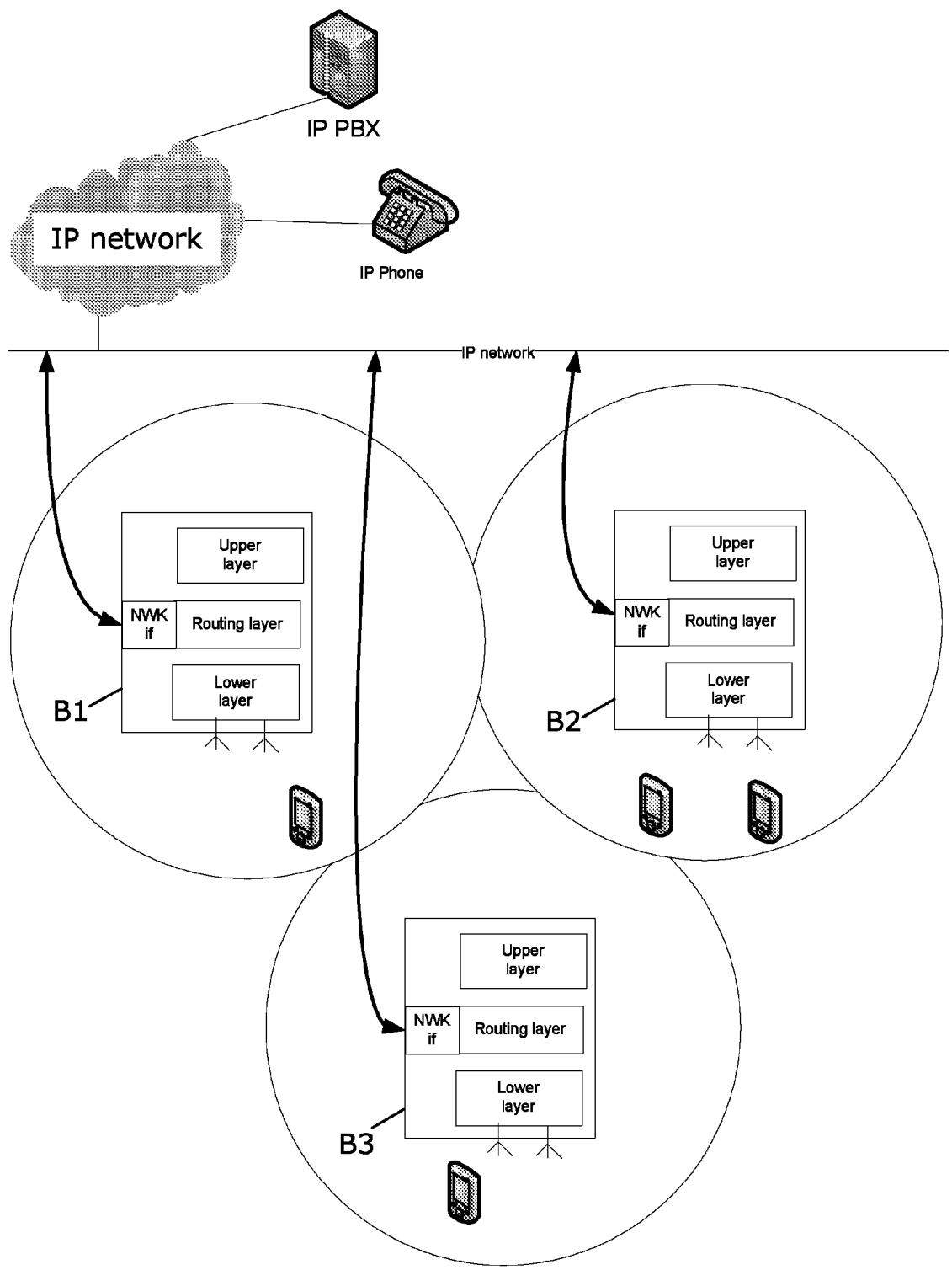
FIG. 4 illustrates an example of a VoIP network with three base stations each with one or two mobile handsets within their respective radio ranges.

FIG. 4 illustrates an example network of three base station devices B1, B2, B3 according to the invention which are connected to an IP network, thus enabling VoIP communication with one of the four wireless terminals distributed within the wireless coverage (circles) of each of the base station devices B1, B2, B3. This allows VoIP calls between the wireless terminals and an IP phone or an IP phone switch, an IP PBX.

Preferably, the base station device are configured for automatic distribution of system configuration data via IP network so as to allow a user to update the system by updating data in one of the base stations B1, B2, B3 only. The same applies to expansion of the system which can be easily done by connecting an extra base station device which has been informed about the identify of the network which it is expected to be a part of. The base station will then automatically be updated with relevant network information that allows the base station to function in the network.

If a base station device fails, the network of base stations is also flexible, since maybe only the radio transceiver of the base station fails, while still the routing and upper layer facilities can still be used in the network. Also the risk of loosing an on-going communication session is minimal due to the possibility that two or three base station devices may be involved in the lower layer handling of the communication session. Thus, even if the lower layer of one base station fails, another base station may be able to take over its tasks and keep the communication session running. If the upper layer of one base station fails, then the on-going communication session is lost, but upper layer activities, e.g. location registration, can be performed on another base station in the network.

Figure 5:
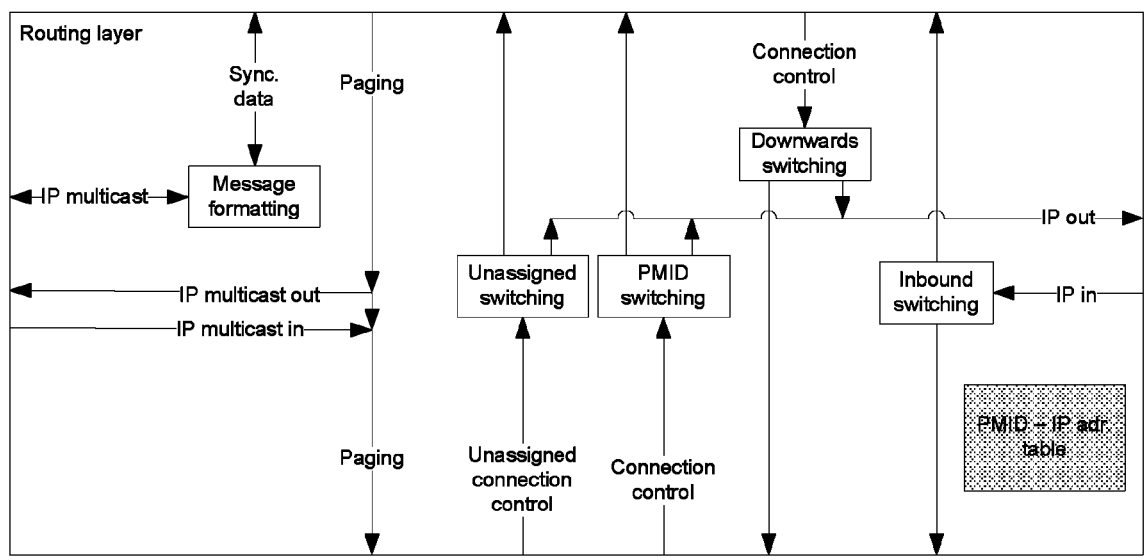
FIG. 5 illustrates a block diagram of an example of elements contained in a routing layer.

FIG. 5 illustrates a possible implementation of the routing layer. As mentioned, the routing layer has mainly the task of sending connection and session control messages between upper and lower layer software components even when these components are residing in physical separate base stations.

Establishment of incoming communication sessions, such as phone calls, is done indirectly by paging the wireless terminal on one of more base stations. Paging messages are sent downwards from upper layer to the local lower layer and sent via IP multicast to other base stations. When receiving IP multicast paging messages the routing layer is sending these downwards to the lower layer and a paging message is broadcasted on the radio transceiver. Hence, paging messages can be broadcasted on multiple base stations.

Physical connections between a wireless terminal and the base station are established by the wireless terminal. When no upper layer session exists for a wireless terminal, a connection is created using a randomly chosen unassigned PMID (Portable MAC identifier). The routing layer "Unassigned switching" will route connection control messages for connections using unassigned PMID to the upper layer in any base station having available resources. Subsequently, an upper layer session is created in a basestation and a unique PMID is assigned for addressing the communication with the wireless terminal. The PMID is constructed such that a unique basestation identity is included in the PMID. All following connection control messages will include the PMID, and this will allow the "PMID switch" by lookup in a table to send the connection control messages via IP network to basestation in which the upper layer session exists. The "Downwards switch" performs lookup in a table containing the mapping between PMID and IP address and forwards connection control messages to the proper lower layer independent of where it physically is located.

The "Inbound switching" determines whether an incoming message is designated for upper or lower layers.

To sum up, the invention provides a wireless base station device for handling wireless communication, e.g. DECT, between a plurality of associated wireless terminals and an IP network. The base station device has a radio transceiver, a network interface, and a processor with communication application and a communication session management software. The communication session management is arranged to control a communication session with an associated wireless terminal (upper layer management), while wireless communication with said associated wireless terminal involved with said communication session (lower layer) is handled by another base station device. Thus, the base station can manage separate operation of its upper and lower layers, thereby enabling e.g. hand-over of a session to and from other base stations. This allows self contained single casing base station devices to operate in a network without the need for at central server, and still such network is easy to extend by adding base stations.

Although the present invention has been described in connection with the specified embodiments, it is not intended to be limited to the specific form set forth herein. Rather, the scope of the present invention is limited only by the accompanying claims. In the claims, the term "comprising" or "including" does not exclude the presence of other elements. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality. Furthermore, reference signs in the claims shall not be construed as limiting the scope.

The invention claimed is:

1. A wireless base station device arranged to handle wireless communication between a plurality of associated wireless terminals (T1, T2, T3) and an IP network, the device comprising:
   a radio transceiver (RT) arranged to wirelessly communicate with the plurality of wireless terminals (T1, T2, T3),
   a network interface (NI) arranged to communicate with the IP network, and
   a processor with software arranged to implement
      a communication application, and
      a communication session management (CSM) for controlling sessions of communication with the plurality of associated wireless terminals (T1, T2, T3),
   wherein the communication session management (CSM) is arranged to control a communication session with an associated wireless terminal (T1, T2, T3), while wireless radio frequency communication with said associated wireless terminal (T1, T2, T3) involved with said communication session is handled by an associated external device (B2, B3),
   wherein a lower layer (LL) comprises the radio transceiver (RT), wherein an upper layer (UL) comprises the communication application and the communication session management (CSM), wherein the device comprises a routing layer (RL) serving to separate the lower layer (LL) and the upper layer (UL) so as to allow the upper layer (UL) to handle communication sessions with associated lower layers (LL) physically separate from the upper layer (UL) and, wherein the radio transceiver (RT), the network interface (NI) and the processor are housed within one single casing.

2. The wireless base station device according to claim 1, wherein the wireless base station device (B2) is further arranged to handle a wireless radio frequency communication with an associated wireless terminal involved with a communication session, while said communication session is controlled by an associated external device (B1).

3. The wireless base station device according to claim 1, wherein the associated external device (B1) is an external wireless base station device.

4. The wireless base station device according to claim 3, wherein the lower layer (LL) further comprises a processor for coding of user data.

5. The wireless base station device according to claim 4, wherein the processor is configured to transcode audio data.

6. The wireless base station device according to claim 1, arranged to hand-over an on-going communication session with an associated wireless terminal to an associated external wireless base station device.

7. The wireless base station device according to claim 6, wherein the device is arranged to receive user data from said external wireless base station device and to relay the user data to the IP network by maintaining an IP address already assigned to the communication session before hand-over.

8. The wireless base station device according to claim 1, wherein the device is arranged to receive paging information from the IP network, and to transmit paging information in a wireless signal via the radio transceiver (RT), so as to allow roaming of the plurality of associated wireless terminals (T1, T2, T3).

9. The wireless base station device according to claim 1, wherein the processor is arranged to exchange system configuration data and identity information on the plurality of associated wireless terminals (T1, T2, T3) via the IP network.

10. The wireless base station device according to claim 1, wherein the plurality of associated wireless terminals (T1, T2, T3) comprises a plurality of wireless mobile handsets arranged for speech communication.

11. The wireless base station device according to claim 1, wherein the wireless base station device is arranged for timing synchronization of the radio transceiver (RT) with an associated external wireless base station device.

12. The wireless base station device according to claim 1, wherein the wireless base station device is arranged for assignment of an identification number on the IP network.

13. The wireless base station device according to claim 1, wherein the wireless radio transceiver (RT) is arranged to wirelessly communicate according to a communication standard selected from the group consisting of DECT/CAT-iq, Bluetooth, WiFi, GSM, LTE, Wimax, 3G, and 4G.

14. The wireless base station device according to claim 1, wherein the communication application comprises a VoIP application so as to enable the device to handle VoIP communication between wireless terminals (T1, T2, T3) and the IP network.

15. A wireless network system comprising:
   a plurality of wireless base station devices (B1, B2, B3), wherein each of the base station devices comprise:
      a radio transceiver (RT) arranged to wirelessly communicate with the plurality of wireless terminals (T1, T2, T3),
      a network interface (NI) arranged to communicate with the IP network, and
      a processor with software arranged to implement
      a communication application, and
      a communication session management (CSM) for controlling sessions of communication with the plurality of associated wireless terminals (T1, T2, T3), wherein the communication session management (CSM) is arranged to control a communication session with an associated wireless terminal (T1, T2, T3), while wireless radio frequency communication with said associated wireless terminal (T1, T2, T3) involved with said communication session is handled by an associated external device (B2, B3), wherein a lower layer (LL) comprises the radio transceiver (RT), wherein an upper layer (UL) comprises the communication application and the communication session management (CSM), wherein the device comprises a routing layer (RL) serving to separate the lower layer (LL) and the upper layer (UL) so as to allow the upper layer (UL) to handle communication sessions with associated lower layers (LL) physically separate from the upper layer (UL) and, wherein the radio transceiver (RT), the network interface (NI) and the processor are housed within one single casing, and a second plurality of wireless terminals (T4, T5, T6) arranged for wireless communication via the radio transceiver (RT) of at least one of the plurality of wireless base station devices (B1, B2, B3).

* * * * *